US012724646B2

(12) United States Patent
Natarajan et al.

(10) Patent No.: US 12,724,646 B2
(45) Date of Patent: Sep. 1, 2026

(54) POST DEPLOYMENT CONFIGURATION TUNING OF CLOUD SERVICES AND APPLICATIONS

(71) Applicant: Microsoft Technology Licensing, LLC, Redmond, WA (US)

(72) Inventors: Nagarajan Natarajan, Bengaluru (IN); Ranjita Bhagwan, Bangalore (IN); Anush Vishwanath Kini, Bengaluru (IN); Karan Tandon, Bengaluru (IN); Mayukh Das, Bengaluru (IN); Rodrigo Lopes Cancado Fonseca, Redmond, WA (US); Yogesh Bansal, Sammamish, WA (US); Gagan Somashekar, Stony Brook, NY (US)

(73) Assignee: Micrsoft Technology Licensing, LLC, Redmond, WA (US)

( * ) Notice: Subject to any disclaimer, the term of this patent is extended or adjusted under 35 U.S.C. 154(b) by 462 days.

(21) Appl. No.: 18/208,701

(22) Filed: Jun. 12, 2023

(65) Prior Publication Data

US 2024/0419510 A1 Dec. 19, 2024

(51) Int. Cl.
*G06F 9/50* (2006.01)

(52) U.S. Cl.
CPC .......... *G06F 9/5077* (2013.01); *G06F 9/5027* (2013.01)

(58) Field of Classification Search
None
See application file for complete search history.

(56) References Cited

U.S. PATENT DOCUMENTS

| | | | | |
|---|---|---|---|---|
| 10,009,292 | B2 * | 6/2018 | Dunbar | H04L 47/827 |
| 10,257,275 | B1 * | 4/2019 | Dirac | H04L 67/1097 |
| 10,771,330 | B1 * | 9/2020 | Rangole | H04L 41/5064 |
| 11,360,795 | B2 * | 6/2022 | Featonby | G06F 9/5027 |
| 11,567,937 | B2 * | 1/2023 | Idicula | G06F 16/24545 |
| 2018/0351816 | A1 * | 12/2018 | Li | G06F 11/3452 |
| 2021/0173670 | A1 * | 6/2021 | Borra | G06F 11/3466 |
| 2021/0286786 | A1 * | 9/2021 | Zhang | G06F 16/217 |
| 2021/0287088 | A1 * | 9/2021 | Peng | G06N 3/006 |
| 2022/0100684 | A1 * | 3/2022 | Martin | G06F 13/20 |

(Continued)

FOREIGN PATENT DOCUMENTS

| | | | | |
|---|---|---|---|---|
| CN | 111651220 A | * | 9/2020 | G06F 18/23 |
| CN | 106663224 A | * | 2/2021 | G06N 20/00 |

(Continued)

OTHER PUBLICATIONS

"Beginner's Guide", Retrieved From: http://nginx.org/en/docs/beginners_guide.html, Retrieved Date: Sep. 6, 2022, 7 Pages.

(Continued)

*Primary Examiner* — Charles E Anya
(74) *Attorney, Agent, or Firm* — Ray Quinney & Nebeker P.C.; Tiffany B. Healy

(57) ABSTRACT

The present disclosure relates to methods and systems for post deployment configuration tuning of applications. The methods and systems automatically determine which configuration parameters of the applications to tune. The methods and systems provide recommended configuration values for the configuration parameters. The methods and systems manage the scope at which to tune to the configuration parameters for the application.

18 Claims, 5 Drawing Sheets

(56) References Cited

U.S. PATENT DOCUMENTS

2023/0078091 A1* 3/2023 Iyer .................... G06F 11/3428 717/124
2023/0140553 A1* 5/2023 Mahindru ........ G06Q 10/06393 705/7.37

FOREIGN PATENT DOCUMENTS

CN 114118433 A * 3/2022 ............ G06N 20/00
WO WO-2016093887 A1 * 6/2016 ......... H04L 43/0817
WO WO-2018223123 A1 * 12/2018 ............ G06N 20/00
WO WO-2019199495 A1 * 10/2019 ........... H04W 12/02
WO WO 2020207268 A1 * 10/2020 ............ G06N 3/045

OTHER PUBLICATIONS

"Controlling nginx", Retrieved From: http://nginx.org/en/docs/control.html, Retrieved Date: Sep. 6, 2022, 4 Pages.
"Deployments", Retrieved From: https://kubernetes.io/docs/concepts/workloads/controllers/deployment/#strategy, Retrieved Date: Sep. 6, 2022, 22 Pages.
"Gofiber / Fiber", Retrieved From: https://github.com/gofiber/fiber, Apr. 22, 2023, 11 Pages.
"Kubernetes / Autoscaler", Retrieved From: https://github.com/kubernetes/autoscaler/tree/master/vertical-pod-autoscaler, Apr. 6, 2023, 11 Pages.
"Memcached(1)—Linux man page", Retrieved From: https://linux.die.net/man/1/memcached, Retrieved Date: Sep. 6, 2022, 3 Pages.
"Redis Configuration", Retrieved From: https://redis.io/docs/management/config/, Retrieved Date: Sep. 6, 2022, 5 Pages.
Abernethy, Randy, "The Programmer's Guide to Apache Thrift", Retrieved From: https://manning-content.s3.amazonaws.com/download/1/0d9009e-1694-4b66-a645-3fb3b870d98e/TheProgrammer%27sGuidetoApacheThriftMEAPch1v17.pdf, Apr. 30, 2018, 28 Pages.
Agarwal, et al., "A Multiworld Testing Decision Service", In Repository of arXiv:1606.03966v1, Jun. 13, 2016, 15 Pages.
Aken, et al., "Automatic Database Management System Tuning Through Large-scale Machine Learning", In Proceedings of the ACM international conference on management of data, May 14, 2017, pp. 1009-1024.
Akgun, et al., "Improving Storage Systems Using Machine Learning", In Journal of ACM Trans. Storage, vol. 1, Issue 1, Jan. 2022, 30 Pages.
Alabed, et al., "High-Dimensional Bayesian Optimization with Multi-Task Learning for RocksDB", In Proceedings of the 1st Workshop on Machine Learning and Systems, Apr. 26, 2021, 9 Pages.
Alipourfard, et al., "CherryPick: Adaptively Unearthing the Best Cloud Configurations for Big Data Analytics", In the Proceedings of the 14th USENIX Symposium on Networked Systems Design and Implementation, Mar. 27, 2017, pp. 469-482.
Ansel, et al., "OpenTuner: An Extensible Framework for Program Autotuning", In Proceedings of the 23rd international conference on Parallel architectures and compilation, Aug. 24, 2014, pp. 303-316.
Auer, et al., "The Nonstochastic Multiarmed Bandit Problem", In Journal of SIAM journal on computing, vol. 32, Issue 1, Nov. 19, 2002, pp. 48-77.
Bietti, et al., "A Contextual Bandit Bake-of", In Journal of Machine Learning Research, vol. 22, May 2021, 49 Pages.
Bilal, et al., "Do the Best Cloud Configurations Grow on Trees? An Experimental Evaluation of Black Box Algorithms for Optimizing Cloud Workloads", In Proceedings of the VLDB Endowment, vol. 13, Issue 12, Jul. 1, 2020, pp. 2563-2575.
Bilal, et al., "Finding the Right Cloud Configuration for Analytics Clusters", In Proceedings of the 11th ACM Symposium on Cloud Computing, Oct. 19, 2020, pp. 208-222.
Buchaca, et al., "You Only Run Once: Spark Auto-tuning from a Single Run", In Journal of IEEE Transactions on Network and Service Management, vol. 17, Issue 4, Oct. 29, 2020, 13 Pages.
Cao, et al., "Carver: Finding Important Parameters for Storage System Tuning", In Proceedings of the 18th USENIX Conference on File and Storage Technologies, Feb. 25, 2020, pp. 43-57.
Cereda, et al., "CGPTuner: a Contextual Gaussian Process Bandit Approach for the Automatic Tuning of IT Configurations Under Varying Workload Conditions", In Proceedings of the VLDB Endowment, vol. 14, Issue 8, Apr. 1, 2021, pp. 1401-1413.
Dean, et al., "The Tail at Scale", In Journal of Communications of the ACM, vol. 56, Issue 2, Feb. 1, 2013, pp. 74-80.
Duan, et al., "Tuning Database Configuration Parameters with iTuned", In Proceedings of the VLDB Endowment, vol. 2, Issue 1, Aug. 24, 2009, pp. 1246-1257.
Elmachtoub, et al., "A Practical Method for Solving Contextual Bandit Problems Using Decision Trees", In Proceedings of Uncertainty in Artificial Intelligence, Jun. 14, 2017, 10 Pages.
Feraud, et al., "Random Forest for the Contextual Bandit Problem", In Proceedings of the 19th International Conference on Artificial Intelligence and Statistics, May 2, 2016, pp. 93-101.
Flaxman, et al., "Online convex optimization in the bandit setting: gradient descent without a gradient", In Proceedings of the sixteenth annual ACM-SIAM Symposium on Discrete Algorithms, Oct. 17, 2004, pp. 385-394.
Gan, et al., "An Open-Source Benchmark Suite for Microservices and Their Hardware-Software Implications for Cloud & Edge Systems", In Proceedings of the Twenty-Fourth International Conference on Architectural Support for Programming Languages and Operating Systems, Apr. 13, 2019, pp. 3-18.
Gen, et al., "Genetic Algorithms and Engineering Optimization", In Publication of John Wiley & Sons, Dec. 28, 1999, 510 Pages.
Golovin, et al., "Google Vizier: A Service for Black-Box Optimization", In Proceedings of the 23rd ACM SIGKDD international conference on knowledge discovery and data mining, Aug. 13, 2017, pp. 1487-1495.
Herodotou, et al., "A Survey on Automatic Parameter Tuning for Big Data Processing Systems", In Journal of ACM Computing Surveys, vol. 53, Issue 2, Apr. 26, 2020, 37 Pages.
Ishikawa, et al., "Dynamic Tuning of Operating Systems", In Proceedings of the 14th IBM Computer Science Symposium Amagi, Oct. 1980, pp. 119-142.
Kale, et al., "Non-Stochastic Bandit Slate Problems", In Journal of Advances in Neural Information Processing Systems, vol. 23, Dec. 6, 2010, 9 Pages.
Karthikeyan, et al., "Learning Accurate Decision Trees with Bandit Feedback via Quantized Gradient Descent", In Journal of Transactions of Machine Learning Research, Sep. 16, 2022, 25 Pages.
Karthikeyan, et al., "SelfTune: Tuning Cluster Managers", In Proceedings of the 20th USENIX Symposium on Networked Systems Design and Implementation, Apr. 17, 2023, pp. 1097-1114.
Kernc, "Scikit-Optimize", Retrieved From: https://github.com/scikit-optimize/scikit-optimize, Oct. 12, 2021, 6 Pages.
Lattimore, et al., "Bandit Algorithms", In Publication of Cambridge University Press, Jul. 16, 2020, 596 Pages.
Li, et al., "HyAR: Addressing Discrete-Continuous Action Reinforcement Learning via Hybrid Action Representation", In Proceedings of the International Conference on Learning Representations, Jan. 29, 2022, 22 Pages.
Li, et al., "Metis: Robustly Tuning Tail Latencies of Cloud Systems", In Proceedings of the USENIX Annual Technical Conference, Jul. 11, 2018, pp. 981-992.
Lillicrap, et al., "Continuous Control with Deep Reinforcement Learning", In Repository of arXiv:1509.02971v1, Sep. 9, 2015, 14 Pages.
Lin, et al., "Adaptive Code Learning for Spark Configuration Tuning", In Proceedings of the IEEE 38th International Conference on Data Engineering, May 9, 2022, pp. 1995-2007.
Luo, et al., "Characterizing Microservice Dependency and Performance: Alibaba Trace Analysis", In Proceedings of the ACM Symposium on Cloud Computing, Nov. 1, 2021, pp. 412-426.
Mahgoub, et al., "OptimusCloud: Heterogeneous Configuration Optimization for Distributed Databases in the Cloud", In Proceedings of the USENIX Annual Technical Conference, Jul. 15, 2020, pp. 189-204.

(56) References Cited

OTHER PUBLICATIONS

Masson, et al., “Reinforcement Learning with Parameterized Actions”, In Proceedings of the Thirtieth AAAI Conference on Artificial Intelligence, Feb. 21, 2016, pp. 1934-1940.
Mehta, et al., “Rex: Preventing Bugs and Misconfiguration in Large Services Using Correlated Change Analysis”, In Proceedings of the 17th USENIX Symposium on Networked Systems Design and Implementation, Feb. 25, 2020, pp. 435-448.
Nelson, Rick, “Tuning NGINX for Performance”, Retrieved From: https://www.nginx.com/people/rick-nelson/, Oct. 10, 2014, 11 Pages.
Nesterov, Yu, “Efficiency Of Coordinate Descent Methods On Huge-Scale Optimization Problems”, In Journal of SIAM Journal on Optimization, vol. 22, Issue 2, Apr. 24, 2012, pp. 341-362.
Nutini, et al., “Coordinate Descent Converges Faster with the Gauss-Southwell Rule Than Random Selection”, In Proceedings of the 32 nd International Conference on Machine Learning, Jun. 1, 2015, 10 Pages.
Olgavrou, “VowpalWabbit / Vowpal_Wabbit”, Retrieved From: https://github.com/VowpalWabbit/vowpal_wabbit, Apr. 24, 2023, 3 Pages.
Qiu, et al., “FIRM: An Intelligent Fine-grained Resource Management Framework for SLO-Oriented Microservices”, In Proceedings of the 14th USENIX Symposium on Operating Systems Design and Implementation, Nov. 4, 2020, pp. 805-825.
Richards, et al., “Giltene / Wrk2”, Retrieved From: https://github.com/giltene/wrk2, Sep. 24, 2019, 16 Pages.
Zhu, et al., “KEA: Tuning an Exabyte-Scale Data Infrastructure”, In Proceedings of the International Conference on Management of Data, Jun. 20, 2021, pp. 2667-2680.
Quinlan, J.R. , “Program for machine learning”, In Publication of Morgan Kaufmann Publishers, Sep. 1, 1994, pp. 235-240.
Richards, Jon, “Giltene / Wrk2”, Retrieved From: https://github.com/giltene/wrk2, Sep. 24, 2019, 16 Pages.
Rossi, et al., “Dynamic Multi-metric Thresholds for Scaling Applications Using Reinforcement Learning”, In Journal of IEEE Transactions on Cloud Computing, Mar. 29, 2022, 15 Pages.
Rzadca, et al., “Autopilot: Workload Autoscaling at Google”, In Proceedings of the Fifteenth European Conference on Computer Systems, Apr. 27, 2020, 16 Pages.
Semke, et al., “Automatic TCP Buffer Tuning”, In Proceedings of the ACM SIGCOMM’98 conference on Applications, technologies, architectures, and protocols for computer communication, Oct. 1, 1998, pp. 315-323.
Shasha, Dennis, “Lessons From Wall Street: Case Studies In Configuration, Tuning, And Distribution”, In Proceedings of the ACM SIGMOD international conference on Management of data, Jun. 1, 1997, pp. 498-501.
Somashekar, et al., “Reducing the Tail Latency of Microservices Applications via Optimal Configuration Tuning”, In Proceedings of the IEEE International Conference on Autonomic Computing and Self-Organizing Systems, Sep. 19, 2022, pp. 111-120.
Sriraman, et al., “μTune: Auto-Tuned Threading for OLDI Microservices”, In Proceedings of the 13th USENIX Symposium on Operating Systems Design and Implementation, Oct. 8, 2018, pp. 177-194.
Sriraman, et al., “SoftSKU: Optimizing Server Architectures for Microservice Diversity @Scale”, In Proceedings of the 46th International Symposium on Computer Architecture, Jun. 22, 2019, pp. 513-526.
Swaminathan, et al., “Off-Policy Evaluation For Slate Recommendation”, In Proceedings of the 31st Conference on Neural Information Processing Systems, Dec. 4, 2017, 11 Pages.
Tang, et al., “Holistic Configuration Management at Facebook”, In Proceedings of the 25th symposium on operating systems principles, Oct. 4, 2015, pp. 328-343.
Tang, et al., “Twine: A Unified Cluster Management System for Shared Infrastructure”, In Proceedings of the 14th USENIX Symposium on Operating Systems Design and Implementation, Nov. 4, 2020, pp. 787-803.
Wajahat, et al., “Lessons Learnt from Software Tuning of a Memcached-Backed, Multi-Tier, Web Cloud Application”, In Proceedings of the Eighth International Green and Sustainable Computing Conference, Oct. 23, 2017, 6 Pages.
Xin, et al., “LOCAT: Low-Overhead Online Configuration Auto-Tuning of Spark SQL Applications”, In Proceedings of the International Conference on Management of Data, Jun. 12, 2022, pp. 674-684.
Zhang, et al., “An End-to-End Automatic Cloud Database Tuning System Using Deep Reinforcement Learning”, In Proceedings of the International Conference on Management of Data, Jun. 30, 2019, pp. 415-432.
Zhu, et al., “BestConfig: Tapping the Performance Potential of Systems via Automatic Configuration Tuning”, In Proceedings of the Symposium on Cloud Computing, Sep. 24, 2017, pp. 338-350.
Breiman, et al. “Classification and Regression Trees” Chapman & Hall/CRC 1984 pp. 1-31.
Norkin, et al. “A branch and bound method for stochastic global optimization” International Institute for Applied Systems Analysis, Jul. 30, 1996, pp. 425-450.
Zhu, et al., “KEA: Tuning an Exabyte-Scale Data Infrastructure” Industrial Track paper SIGMOD ’21, Jun. 20-25, 2021 Virtual Event, China pp. 2667-2680.

* cited by examiner

POST DEPLOYMENT CONFIGURATION TUNING OF CLOUD SERVICES AND APPLICATIONS

BACKGROUND

Application/service deployments have hundreds to thousands of inter-dependent configuration parameters, many of which significantly influence performance and efficiency. With today's complex and dynamic services, operators need to continuously monitor and set the right configuration values ("configuration tuning") well after a service is widely deployed. This is challenging since experimenting with different configurations post-deployment may reduce application performance or even disrupt its functions.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes receiving a request to tune configuration parameters for an application. The method includes performing a tuning instance to automatically determine recommended configuration values for the configuration parameters in response to the request. The method includes providing the recommended configuration values to the application.

Some implementations relate to a device. The device includes a processor; memory in electronic communication with the processor; and instructions stored in the memory, the instructions being executable by the processor to: receive a request to tune configuration parameters for an application; perform a tuning instance to automatically determine recommended configuration values for the configuration parameters in response to the request; and provide the recommended configuration values to the application.

Some implementations relate to a method. The method includes receiving a request to tune configuration parameters for an application and a context for the application. The method includes using the context to traverse a decision tree to automatically determine recommended configuration values for the configuration parameters in response to the request. The method includes providing the recommended configuration values to the application.

Some implementations relate to a device. The device includes a processor; memory in electronic communication with the processor; and instructions stored in the memory, the instructions being executable by the processor to: receive a request to tune configuration parameters for an application and a context for the application; use the context to traverse a decision tree to automatically determine recommended configuration values for the configuration parameters in response to the request; and provide the recommended configuration values to the application.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
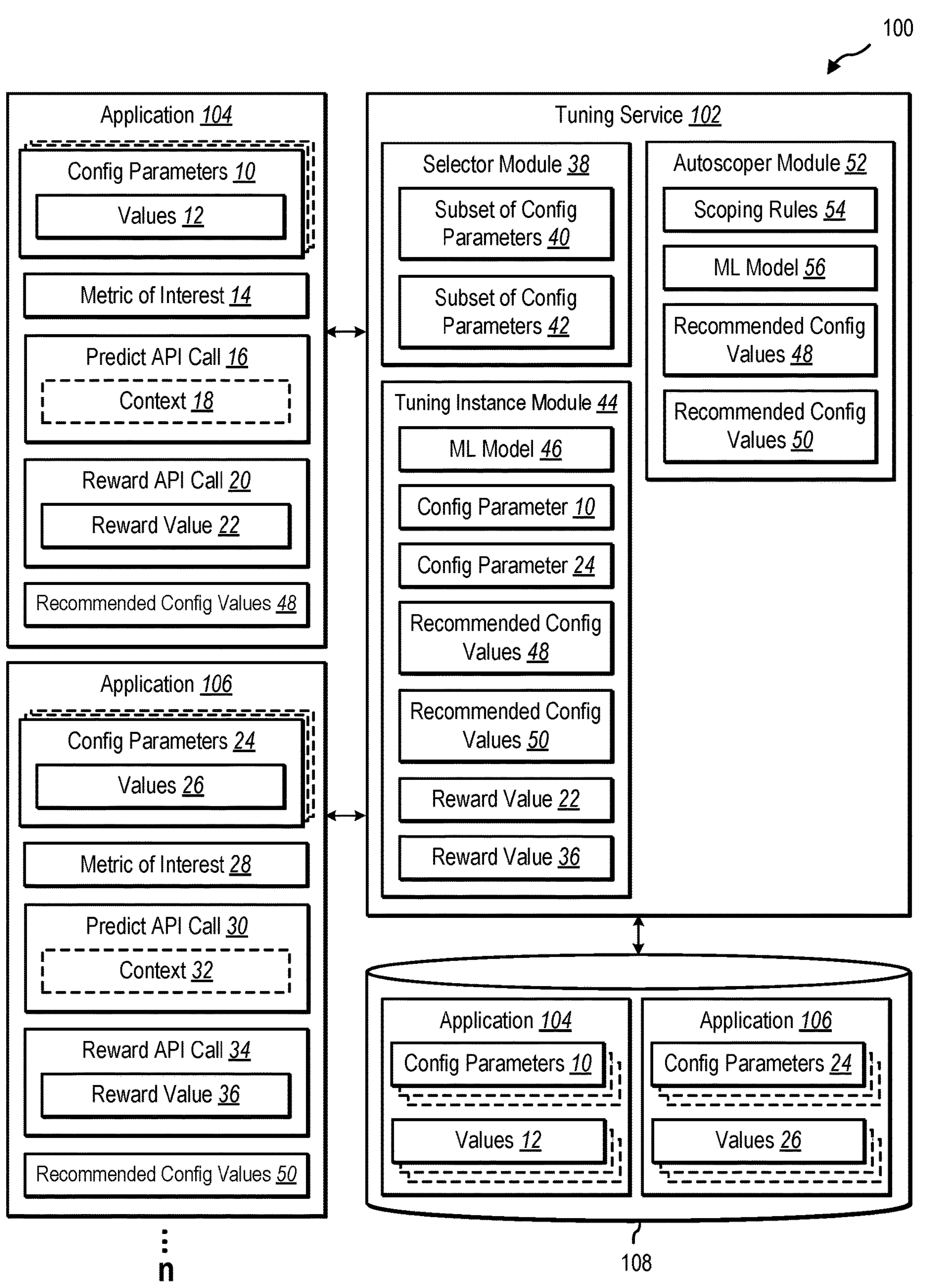
FIG. 1 illustrates an example environment with a tuning service in accordance with implementations of the present disclosure.

Application/service deployments have hundreds to thousands of inter-dependent configuration parameters, many of which significantly influence performance and efficiency. The performance and efficiency of large services and applications depend heavily upon how they are configured. Configuration parameters can be system-level. An example system-level configuration is read_ahead_-kb which decides how much extra data to read from disk during I/O in Linux. Another example system-level configuration is resources.limits.cpu that limits the amount of CPU a Kubernetes container uses. Configuration parameters can also be application-level. An example application-level configuration is a max memory, the memory usage limit at which Redis starts evicting keys.

Any large application invariably includes hundreds, if not thousands, of configuration parameters at multiple layers and components. Application operators typically determine the configuration values using domain-knowledge and canary testing on relatively small deployments before widely deploying the application. Application behavior can change considerably with time, and therefore the configuration values set before deployment may not work well in the longer term. Moreover, developers continue to add features and optimize the code and machines that hosts the applications are continuously retired and newer machines with different profiles are introduced.

Operators need to constantly monitor and modify these configuration parameters well after they have deployed the application. Manually exploring and changing the configurations at regular time intervals can be extremely tedious and risky too, given that the number of parameters is large and, the values of parameters can depend on each other and the deployment environment.

Existing solutions use machine learning algorithms to change configuration values. However, since the applications or services can easily have thousands of configuration parameters, it is prohibitively expensive for existing solutions to automatically tune all of the configuration parameters simultaneous. Moreover, using the exiting solutions to experiment with different configurations post-deployment may reduce application performance or even disrupt its functions.

The methods and systems of the present disclosure enable configuration tuning of cloud applications in deployment. The deployment of applications makes the applications available for use by end users. In some implementations, the applications are deployed in a cloud computing environment. For example, the methods and systems facilitate a specific URL on a server to provide access to an application. The methods and systems of the present disclosure include several practical applications that provide benefits and/or solve problems associated with tuning configuration parameters of applications in deployment.

The methods and systems provide a tuning service that is hosted on the cloud that automates the post-deployment configuration tuning of applications and automatically provides the values for the configuration parameters. The tuning instances for tuning the configuration parameters are automatically created, persisted, and managed by the tuning service. The applications access the tuning service via customized endpoints. The tuning service automatically determines which configuration parameters to tune and manages the scope at which to tune the configuration parameters of applications. The configuration parameters are different settings that affect a behavior of the application. The tuning service uses a reinforcement learning algorithm to simultaneously tune numerical and categorical configuration parameters to identify recommended configuration values fast, thereby keeping the overhead of configuration tuning low. Numerical configuration parameters include configuration parameters that can move over a range of real values. Categorical configuration parameters include configuration parameters that can move in discrete values.

The methods and systems provide an end-to-end configuration tuning service for applications to automatically tune the configuration parameters for the applications while the applications are in production serving workloads (current user workloads). Each application may have hundreds to thousands of configuration parameters. Changes to the applications or an environment of the application may affect the performance of the application and new values may need to be identified for the configuration parameters. Example changes include workload changes (increase or decrease in workloads), hardware changes (new hardware is added with different performance capabilities), and/or temporal changes (weekends versus weekdays or different time of day).

The methods and systems continue to evaluate the configuration parameter settings for the applications (the values for the configuration parameters) and as changes occur to the application or the environment of the application, the tuning service tunes the configuration parameters to identify new configuration parameter settings (new values for the configuration parameters) for the application.

The methods and systems provide an easy-to-use API to access the endpoints of the tuning service. The tuning service is easily integrated into existing cloud applications with minimal engineering effort. With initial handshakes between the application and the tuning service, developers can easily automate the configuration tuning of the application's configuration parameters. The tuning service automates the entire pipeline of configuration tuning without developer intervention.

The tuning service filters impactful parameters that impact the metric of interest (which is specified by a developer during setup of the tuning service). For example, the tuning service automatically identifies a subset of configuration parameters that impact the metric of interest. The tuning service gradually explores new parameter values for the filtered parameters in the live application (a deployed application supporting users' workloads) with minimal disruption to the application. The tuning service also converges on the "best parameters" fast (in terms of time taken).

The tuning service uses a reinforcement learning algorithm that can tune both real-valued numerical configuration parameters and discrete/categorical configuration parameters iteratively over time. The tuning service also uses an online decision tree learning algorithm that tunes the configuration parameters based on the context presented to the tuning service by the application.

One example use case includes a web application uses two containers on a single machine: one to host a front-end webserver, and the other to run a back-end database. While serving user requests, the application can enlist the tuning service to learn how to distribute the machine's memory and compute between the webserver and the database so as to minimize P95 request latency. The tuning service consumes feedback (or reward) from the application in the form of observed hourly P95 latency and uses multiple hours' feedback to converge on the right memory and compute distribution between the two containers. Request characteristics can vary with time; thus, the tuning service may need to change the distribution of memory and compute frequently and converge quickly to stable configuration values while continuing to minimize P95 latency.

One technical advantage of the methods and systems of the present disclosure is improving performance of applications. Another technical advantage of the methods and systems of the present disclosure is enabling configuration turning of applications in deployment. Another technical advantage of the methods and systems of the present disclosure is reducing application interruptions while maximizing the performance of deployed applications. For example, when the workload or underlying infrastructure changes for an application, the methods and systems of the present disclosure maximize the performance of deployed applications by enabling configuration tuning of applications in deployment. Another technical advantage of the methods and systems of the present disclosure is tuning both numerical and categorical configurations. Another technical advantage of the methods and systems of the present invention is reducing the overhead of configuration tuning, saving costs of applications.

The methods and systems continuously tune the specified configuration parameters of an application such that, over time, a given reward metric (e.g., daily P95 latency, or how far off the hourly resource utilization is from the desired bounds) is maximized, and the application sustains good performance through long-term and short-term hardware changes and workload fluctuations.

Referring now to FIG. 1, illustrated is an example environment 100 for use with a tuning service 102 to automatically tune the configuration parameters of applications. In some implementations, the tuning service 102 is hosted on an endpoint in a cloud computing network. A plurality of applications (e.g., application 104, application 106 up to n applications, where n is a positive integer) are in communication with the tunning service 102. In some implementations, the applications 104, 106 are cloud applications hosted on the cloud computing network.

In some implementations, the tuning service 102 provides, to each application 104, 106 in communication with the tuning service 102, a unique uniform resource locator (URL) configured to an end point of the tuning service 102. For example, the application 104 is provided one URL for accessing the tuning service 102 and the application 106 is provided a different URL for accessing the tuning service 102. The applications 104, 106 use application programming interface (API) calls to invoke the URL for the applications 104, 106 and communicate with the tuning service 102.

Each application 104, 106 performs an initialization with the tuning service 102 using API calls to the tuning service 102. The initialization includes providing the tuning service 102 with the configuration parameters 10, 24 for the application 104, 106 and initial values 12, 26 for the configuration parameters 10, 24. For example, a developer for the application 104 specifies the configuration parameters 10 for the application 104 and the values 12 for the configuration parameters 10, and a developer of the application 106 specifies the configuration parameters 24 for the application 106 and the values 26 for the configuration parameters 24.

The initialization also includes a metric of interest 14, 28 for the application 104, 106. Example metrics of interest 14, 28 include latency of the application, daily P95 latency of the application, user satisfaction of the application, hourly resource utilization of the application, and/or average job completion time in a workload for the application. For example, a developer for the application 104 identifies one or more metrics of interest 14 for the application 104 and provides the metric of interest(s) 14 to the turning service 102, and a developer for the application 106 identifies one or more metrics of interest 28 for the application 106 and provides the metric of interest(s) 28 to the turning service 102.

The tuning service 102 stores for each application 104, 106, the configuration parameters 10, 24 and values 12, 26 for the configuration parameters 10, 24 in a datastore 108. The values 12, 26 may change for the configuration parameters 10, 24 in response to the tuning service 102 performing the tuning for the configuration parameters 10, 24 after the application is deployed in production serving user workloads. Tuning includes identifying whether to change the values 12, 26 for the configuration parameters in response to the application being deployed into production.

The tuning service 102 includes a tuning instance module 44 that uses a tuning algorithm to iteratively tune the configuration parameters 10, 24 and identify recommended configuration values 48, 50 for the configuration parameters 10, 22 after the application 104, 106 is deployed into a production environment serving user workloads. Each iteration is called a round. At each round, the tuning algorithm (i) determines the next set of parameter values (e.g., the recommended configuration values 48, 50) for the application 104, 106, (ii) observes a reward (e.g., the reward value 22, 36) computed by the application 104, 106 over a predetermined period (1 hour, 24 hours, etc.), and (iii) updates a policy which prescribes how to choose parameters based on the reward. Changes made by the tuning algorithm to configuration values 12, 26 may cause disruptions (e.g., may necessitate application restarts or even cause downtime). The number of rounds to learn suitable configuration values, proportional to the number of rewards measured, is called sample complexity. The tuning service 102 achieves low sample complexity for tuning in deployments.

A tuning instance is initiated in response to the application 104, 106 providing a predict API call 16, 30 to the tuning service 102. The application 104, 106 invokes a predict API call 16, 30 to fetch recommended configuration values 48, 50 for the configuration parameters 10, 24 for a tuning instance. In some implementations, the recommended configuration values 48, 50 are the same as the values 12, 26 provided for the configuration parameters 10, 24. In some implementations, the recommended configuration values 48, 50 are different from the values 12, 26 provided for the configuration parameters 10, 24.

The tuning instance module 44 uses a machine learning model 46 to perform the tuning for the configuration parameters 10, 22 and determine whether to change the values 12, 26 for the configuration parameters 10, 22. The information stored in the datastore 108 (e.g., the configuration parameters 10, 24 and the values 12, 26) is used as the input for the machine learning model 46.

In addition, the application 104, 106 provides a reward API call 20, 34 with the reward value 22, 36 at a point in time after one or more predict API calls 16, 30 are provided by the application 104, 106. The reward value 22, 36 is computed by the application 104, 106 over a predetermined period (1 hour, 24 hours, etc.). The reward function itself changes with time and the same configuration parameter choices and values may have very different effects on the application 104, 106 from one instant to the next. For instance, diurnal workload fluctuations in the application workloads can induce very different reward values 22, 36 for the same setting of memory requirements for a container, depending on how and when the reward function is computed, e.g., hourly P95 latency can vary significantly between peak and off-peak hours.

The reward value 22, 36 is also provided as input to the machine learning model 46. The machine learning model 46 uses a tuning algorithm to continue to evaluate different values for the configuration parameters 10, 24 based on the reward value 22, 36 to explore potential parameter choices (e.g., recommended configuration values 48, 50) that may yield better rewards. The machine learning model 46 iteratively tunes the configuration parameters 10, 24 after the application 104, 106 is deployed online using bandit feedback. The machine learning model 46 uses the values 12, 26 of the configuration parameters 10, 24 (e.g., number of CPU cores and memory size for the container) and the feedback from the application 104, 106 (the reward value 22, 36) as input to determine the recommended configuration values 48, 50 for the configuration parameters 10, 24. In some implementations, the machine learning model 46 selects recommended configuration values 48, 50 that maximize the metric of interest 14, 28.

In some implementations, the configuration parameters 10, 24 include numerical configuration parameters that move over a range of real values (e.g., CPU utilization threshold). In some implementations, the configuration parameters 10, 24 include categorical configuration parameters that are discrete values (e.g., number of CPU cores). In some implementations, the configuration parameters 10, 24 include a hybrid configuration space with both numerical configuration parameters and categorical configuration parameters. The hybrid configuration space includes a categorical space C: $=C_1 \times C_2 \times \ldots \times C_k$ over k (where k is a positive integer) categorical (C) parameters, where each $C_i$ denotes the possible choices for the categorical parameter i (where i is a positive integer). The hybrid configuration space also includes a numerical space $W=W_1 \times W_2 \times \ldots \times W_m$ over m (where m is a positive integer) numerical parameters, where each $W_i$ indicates a subset of the real line R, e.g., specified by lower and upper bounds for the $i^{th}$ parameter. In some implementations, discrete parameters p are treated as numerical configuration parameters to exploit that they are ordered spaces. For example, discrete parameters p, such as number of CPU cores, are treated as numbers ranging from 2 through 16 by letting Wp={2,4, . . . ,16}.

The machine learning model 46 outputs recommended configuration values 48, 50 for the configuration parameters 10, 24 that improve the reward value 22, 36. In some implementations, the machine learning model 46 uses Algorithm 1 as the tuning algorithm to determine the recommended configuration values 48, 50 for the configuration parameters 10, 24.

Algorithm 1 maintains a multinomial distribution $p^{(t)}$ over categorical actions C, i.e., there is a probability associated with each possible k-tuple of categorical parameter choices at every round t (where t is a positive integer). For the numerical actions, it maintains a vector $w^{(t)} \in R^m$.

Algorithm 1 HybridBandits: Post-Deployment Configuration Tuning for Hybrid Spaces 1: Input: exploration parameter $\varepsilon \in (0,1)$, learning rate $\eta > 0$, categorical parameter space $C := C_1 \times C_2 \times \ldots \times C_k$, numerical parameter space $\mathcal{W} = \mathcal{W}_1 \times \mathcal{W}_2 \times \ldots \times \mathcal{W}_m$ 2: Initialized: categorical space weights $p_i^{(0)} = 1/|C|$, for $1 \le i \le |C|$ // uniform distribution, and numerical parameters $w_i^{(0)} \in W_t$, for for $1 \le i \le m$ // default choices 3: for t = 0, 1, 2, . . . do 4: Let $\tilde{p}_i := (1-\varepsilon)p_i^{(t)} + \varepsilon\frac{1}{|C|}$ // Define explore-exploit multinomial distribution over the categorical space ① Sample categorical and numerical actions to deploy 5: Sample $c \sim \tilde{p}$ from the multinomial and let $a_c^{(t)}$ be the corresponding k-tuple of categorical parameters 6: Sample numerical parameters from a ball centered at $w^{(t)}$, radius ε, i.e., $\hat{w}^{(t)} := w^{(t)} + \varepsilon u$, where $u \in \mathbb{R}^m$ is sampled from $\{u: \|u\|_2 = 1\}$ // Identical to Bluefin [39]

② Deploy the actions and measure reward

7: Deploy numerical $a_r^{(t)} := \prod_w(\hat{w}^{(t)})$ // appropriately scaled and categorical action $a_c^{(t)}$ in the application 8: Receive reward $r^{(t)} := r_c(a_c^{(t)}, a_r^{(t)}) \in \mathbb{R}$ // black-box access to a metric e.g., hourly P95 latency, computed by the application ③ Perform updates based on the reward received 9: Update numerical parameters center: $w^{(t+1)} \leftarrow w^{(t)} + \frac{1}{\varepsilon} \cdot \eta \cdot r^{(t)} \cdot u$, where u is the sample obtained in Step 6.

10: Define scaled reward: $\tilde{r}^{(t)} = r^{(t)}/\tilde{p}_c$, where c is the sample obtained in Step 5

-continued

Algorithm 1 HybridBandits: Post-Deployment Configuration Tuning for Hybrid Spaces 11: Update categorical distribution:

$$p_c^{(t+1)} \leftarrow p_c^{(t)} e^{\eta \tilde{r}^{(t)}}, \text{ and for } i \ne c,\ p_i^{(t+1)} \leftarrow p_i^{(t)};$$

Renomalize $p^{(t+1)}$ to sum 1

At each round of the Algorithm 1, Algorithm 1 maintains different types of policies for sampling categorical and numerical actions. Algorithm 1 has a ε-greedy policy for the categorical configuration space, standard in multi-arm bandit algorithms where with probability a random arm is explored, and with probability 1-ε, high-reward arms are exploited. In addition, Algorithm 1 has a "perturbation" policy for numerical configurations, where the algorithm samples numerical configurations from an c radius ball centered around the "current best" configuration vector. Algorithm 1 also uses a single reward that the system provides as feedback to update both the policies simultaneously. Algorithm 1 applies same-efficient gradient-descent update for the numerical parameters, and the exponential weights update for the categorical parameters.

The weights for the numerical parameters w are initialized to default choices that the application provides (e.g., the initial values 12, 26). The multinomial p is initialized to the uniform distribution, i.e., $p_i=1/|C|$ for $i \in C$. At each round, the Algorithm 1 performs sampling actions (steps 5-6 of Algorithm 1). For the categorical actions, following the standard exponential weights algorithm, it samples a k-tuple from the distribution p (exploit) with probability 1 ε, and from the uniform distribution (explore) with probability ε. For the numerical actions, it samples a m-dimensional vector from a ball centered at the current w, with radius ε.

At each round, the Algorithm 1 also deploys actions and receive reward (steps 7-8 of Algorithm 1). The sampled numerical (scaled appropriately) and categorical configurations are deployed in the application 104, 106, and (after a certain amount of time) the Algorithm 1 receives a reward value (e.g., reward value 22, 36) from the application 104, 106 (e.g., in the reward API call 20, 34).

At each round, the Algorithm 1 also performs update policies (steps 9-11 of Algorithm 1). For the numerical parameter weights, the Algorithm 1 follows the gradient estimation scheme. For the categorical parameters, Algorithm 1: (a) computes an unbiased estimate of the reward for the sampled choices, and (b) scales the probability of the sampled choices using a factor that is exponential in the reward estimate.

In some implementations, the machine learning model 46 runs the Algorithm 1 until the recommended configuration values 48, 50 for the configuration parameters 10, 24 improve the reward value 22, 36 (e.g., latency or throughput of the application is improved).

The tuning service 102 provides the recommended configuration values 48, 50 for the configuration parameters 10, 24 to the applications 104, 106 in response to the predict API call 16, 30. In some implementations, the applications 104, 106 automatically modify the values 12, 26 of the configuration parameters 10, 24 with the recommended configuration values 48, 50.

In some implementations, the configuration parameters 10, 24 and the metric of interest 14, 28 are provided to a selector module 38. The selector module 38 minimizes the number of configuration parameters 10, 24 to tune for the applications 104, 106 by identifying a subset of configuration parameters 40, 42 to tune for each application 104, 106. The selector module 38 prunes the size of the configuration space for the tuning algorithm, which in turn helps reduce the algorithm's sample complexity. In addition, the selector module 38 helps minimize the number of disruptions (e.g., container restarts) in the application 104, 106 while tuning.

The selector module 38 uses the metric of interests 14, 28 to select the subset of configuration parameters 40, 42. In some implementations, the selector module 38 uses a machine learning model to identify the configuration parameters 10, 24 that impact the metric of interests 14, 28. The machine learning model assesses the effect of changing the values 12, 26 each configuration parameter 10, 24 on the application's 104, 106 performance (i.e., the reward value 22, 36), while keeping the other values for the configuration parameters fixed (e.g., to the initial or default value selected). The machine learning model iteratively picks the configuration parameters 40, 42 to maximize the metric of interest 14, 28.

The selector module 38 places the configuration parameters 10, 24 into an order based on a level of impact to the metric of interest 14, 28 (e.g., configuration parameters with a high impact to the metric of interest are placed higher in the list as compared to configuration parameters with a lower impact to the metric of interest). The selector module 38 selects the subset of configuration parameters 40, 42 from a top portion of the ordered list. In some implementations, the configuration selector module 38 picks top-n (where n is a positive integer) configuration parameters 10, 24, sorted by decreasing magnitudes of gradients where n is customizable by the application 104, 106. For example, the selector module 38 selects the top 20 configuration parameters 10, 24 for the subset of configuration parameters 40, 42. Each application 104, 106 may have different configuration parameters 10, 24 and different metrics of interests 14, 28 resulting in different subsets of configuration parameters 40, 42 selected for each application 104, 106.

One example use case of the applications 104, 106 includes several hundreds or thousands of configuration parameters 10, 24 to tune across various layers of the application stack. The selector module 38 picks the configuration parameters 10, 24 that are most promising to tune as compared to the metric of interest 14, 28. For example, the selector module 38 picks 20 configuration parameters of the thousand configuration parameters 104, 106 of the application 104, 106.

In some implementations, the tuning instance module 44 performs the tuning for a tuning instance to identify whether to change the values 12, 26 for the subset of configuration parameters 40, 42 after the application 104, 106 is deployed into a production environment serving user workloads while ignoring any configuration parameters 10, 24 not included in the subset of configuration parameters 40, 42. The tuning instance module 44 uses the machine learning model 46 to perform the tuning for the subset of configuration parameters 40, 42 and determine the recommended configuration values 48, 50 for the subset of configuration parameters 40, 42. For example, the machine learning model 46 uses the Algorithm 1 as the tuning algorithm to tune the subset of configuration parameters 40, 42 and determine the recommended configuration values 48, 50. The tuning instance module 44 provides the recommended configuration values 48, 50 to the applications 104, 106.

In some implementations, the applications 104, 106 provide a context 18, 32 in the predict API call 16, 30. In some implementations, the context 18, 32 is a cost associated with changing the configuration parameters 10, 24. For example, if to update a value for the configuration parameter results in a system (container or VM) restart, the configuration parameter has a high cost associated with the configuration parameter. The tuning instance module 44 may use the context 18, 32 in deciding of how often to tune the configuration parameters 10, 24.

In some implementations, the context 18, 32 provides infrastructure information (e.g., machine type) for the machines used for deploying the applications 104, 106. In some implementations, the context 18, 32 provides functionality (e.g., API calls) for the applications 104, 106. In some implementations, the context 18, 32 provides workload information (e.g., requests per second) for the applications 104, 106. In some implementations, the context 18, 32 includes temporal information (e.g., time of day, season information, day of the week). The context 18, 32 may include any additional information that provides a description of the deployment environment or characteristics of the user workloads.

The applications 104, 106 may have different performance characteristics on machines with different CPUs or memory sizes, and hence may consider using a different configuration tuning instance for each machine type. Similarly, the applications 104, 106 may behave differently for light versus heavy workloads, and for different API call types. For instance, if the application 104, 106 runs independently on the cluster machines with varying hardware and workloads, then the application 104, 106 may create one tuning instance per machine. Thus, tuning instances for the applications 104, 106 may be scoped along at least three dimensions: infrastructure (e.g., machine type), functionality (e.g., API call), and workload (e.g., requests per second).

In some implementations, the tuning service 102 uses an autoscoper module 52 to perform joint scoping and configuration tuning at each round. The autoscoper module 52 automatically determines the scope of the tuning instances for the configuration parameters 10, 24 based on the context 18, 32 (e.g., machine type, disk type, spindle speed, workload volume, etc.) provided by the application 104, 106. In some implementations, the autoscoper module 52 uses a machine learning model 56 to use the context 18, 32 to determine scoping rules 54 for the tuning instance.

An example use case includes given a job type (jobtype) and requests per second (rps) as the context 18, 32, and the number of cores (numcores) and the memory as the configuration values to tune, the machine learning model 56 automatically learns scoping rules 54 of the form if (jobtype='cpu_bound') and (rps>1000) then numcores=16, mem=2G else numcores=4, mem=2G.

In some implementations, the autoscoper module 52 uses decision tree models to capture the scoping rules 54. Each root-to-leaf path in the tree constitutes a scope, and each leaf maintains a tuning instance for the scope. Each leaf maintains recommended configuration values 48, 50 for a scope and the recommended configuration values 48, 50 are returned for a predict API call 16 satisfying the scope (e.g., the root-to-leaf path in the tree). The recommended configuration values 48, 50 are updated when a reward value 22, 32 arrives from the application 104, 106. The machine learning model 56 uses iterative learning to scope tuning instances via the decision tree. At each round, the machine learning model 56 uses the observed context 18, 32 (e.g., requests per second, cluster information, job information) to update the tree model and the leaf instances (e.g., number of core values and memory configuration values) that the machine learning model 56 lands in on the tree model.

In some implementations, the autoscoper module 52 uses the machine learning model 56 to maintain a binary decision tree $f_T$ to capture the scoping rules 54. Each decision tree model has a maximum specified height. For example, the height is 3. The machine learning model 56 traverses the decision tree models based on the context 18, 32 provided by the application 104, 106. At first, the tree $f_T^{(0)}$ effectively behaves like a single tuning instance, initialized identical to Algorithm 1. At round t, the algorithm observes a context vector, denoted as $c_t$. When the current tree model $f_T^{(t)}$ ($c_t$) is applied to $c_t$, it will land in a unique leaf node containing a tuning instance. The root-to-leaf path $c_t$ traverses is the current scope based on the context 18, 32 provided, and the autoscoper module 52 will invoke the leaf's tuning instance. This amounts to doing one round of Algorithm 1 on the instance, thereupon updating the instance.

The machine learning model 56 updates the tree model $f_T^{(t)}$ parameters, i.e., the weights in the internal nodes of the tree which make the branching (scoping) decisions, based on the same reward value 22, 36 that was used to update the leaf instance. The machine learning model 56 updates all the internal nodes along the path traversed b $c_t$ based on the same reward value 22, 36 that was used to update the leaf instance. At the end of round t, all the nodes in the scope of $c_t$ will be updated using a single reward value.

The autoscoper module 52 exploits the context 18, 32 provided by the application 104, 106 to simultaneously perform scoping and configuration tuning. The autoscoper module 52 help applications 104, 106 create, manage, and scope the tuning instances in deployment based on the dynamic context 18, 32 information provided by the applications 104, 106.

The applications 104, 106 can use the tuning service 102 to create one or more tuning instances to tune configuration parameters 10, 24 across various layers of the application stack, based on requirements of the applications 104, 106. The tuning instances are automatically created, persisted, and managed by the tuning service 102. The applications 104, 106 receive the recommended configuration values 48, 50 from the tuning service 102 in response to the predict API call 16, 30. The tuning service 102 reduces application interruptions while maximizing the performance of deployed applications 104, 106 as and when the workload or the underlying infrastructure changes for the deployed applications 104, 106. While two applications 104, 106 are illustrated, the tuning service 102 can support up to n applications (where n is a positive integer) and tune the configuration parameters 10, 24 up to n and provide the recommended configuration values 48, 50 up to n.

In some implementations, one or more computing devices (e.g., servers and/or devices) are used to perform the processing of the environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the tuning service 102 and/or the datastore 108 is implemented wholly on the same computing device. Another example includes one or more subcomponents of the tuning service 102 (e.g., the selector module 38, the tuning instance module 44, the autoscoper module 52) and/or the datastore 108 are implemented across multiple computing devices. Moreover, in some implementations, one or more subcomponent of the subcomponents of the tuning service 102 (e.g., the selector module 38, the tuning instance module 44, the autoscoper module 52) and/or the datastore 108 may be implemented are processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. The processors may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. Memory is in electronic communication with the processors. The memory may be any electronic component capable of storing electronic information. For example, the memory may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

Figure 2:
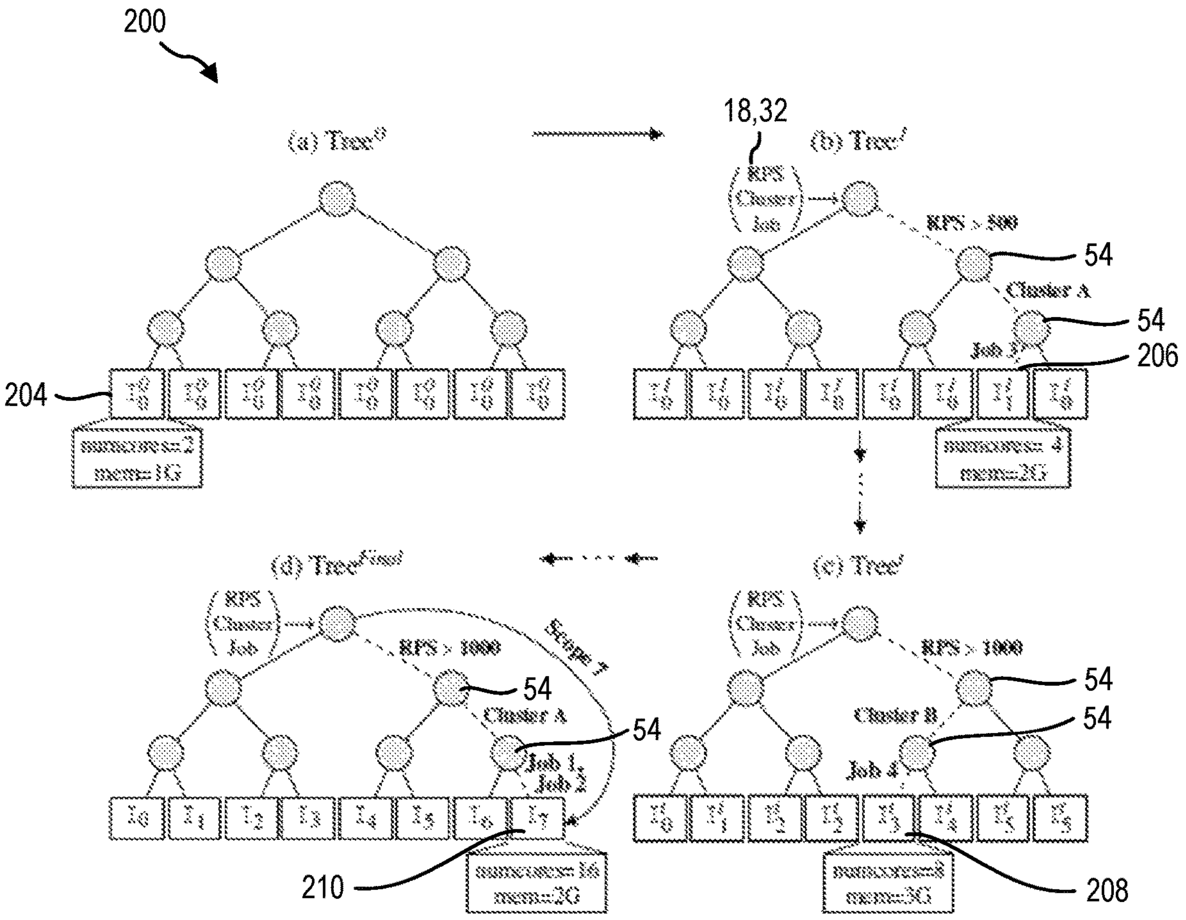
FIG. 2 illustrates an example decision tree in accordance with implementations of the present disclosure.

FIG. 2 illustrates updating an example decision tree 200 for use with the autoscoper module 52 (FIG. 1). The decision tree 200 includes a plurality of nodes and a plurality of leaf nodes. Each node includes a different scoping rule 54 for branching. Each root-to-leaf path in the decision tree 200 constitutes a scope, and each leaf node maintains a tuning instance for the scope. Each leaf node maintains the recommended configuration values 48, 50 (FIG. 1) for the configuration parameters 10, 24 (FIG. 1) in the leaf node.

An example scoping rule 54 includes given a job type (jobtype) and requests per second (rps) as the context 18, 32, and the number of cores (numcores) and the memory as the configuration values (e.g., the configuration parameters 10, 24 (FIG. 1)) to tune, the scoping rule 54 includes if (jobtype='cpu_bound') and (rps>1000) then numcores=16, mem=2G else numcores=4, mem=2G.

For example, the leaf node 204 has the recommended configuration values 48, 50 numcores=2 and mem=1. The leaf node 206 has the recommended configuration values 48, 50 numcores=4 and mem=2G. The leaf node 208 includes the recommended configuration values 48, 50 numcores=8 and mem=3G. The leaf node 210 includes the recommended configuration values 48, 50 numcores=16 and mem=2G.

The autoscoper module 52 (FIG. 1) determines the scoping rules 54 for each node in the decision tree 200. In addition, the autoscoper module 52 uses the observed context (e.g., the context 18 (FIG. 1) and the context 32 (FIG. 1)) from the applications (e.g., the applications 104, 106 (FIG. 1)) to update the decision tree 200 and the leaf instances.

The turning service 102 (FIG. 1) returns the recommended values 48, 50 to the application 104, 106 in response to the predict API call 16, 30 (FIG. 1) from the application 104, 106 satisfying this scope. The recommended values 48, 50 are updated by the autoscoper module 52 in response to a reward value 22, 36 arriving for these requests from the application 104, 106.

For example, the scope 7 is interpreted by the autoscoper module 52 as an application running in Cluster A, when its workload volume (RPS)>1000, involving jobs of type 1 or 2. The leaf node 214 maintains a tuning instance (e.g., the recommended configuration values 48, 50 for the two parameters numcores and memory). The turning service 102 (FIG. 1) returns the recommended values 48, 50 (e.g., numcores=16 and memory=2G) to the application 104, 106 in response to the predict API call 16, 30 (FIG. 1) from the application 104, 106 satisfying the scope 7.

The decision tree 200 allows the tuning service 102 to exploit the context 18, 32 provided by the application 104, 106 to simultaneously do scoping and configuration tuning for the configuration parameters 10, 24.

Figure 3:
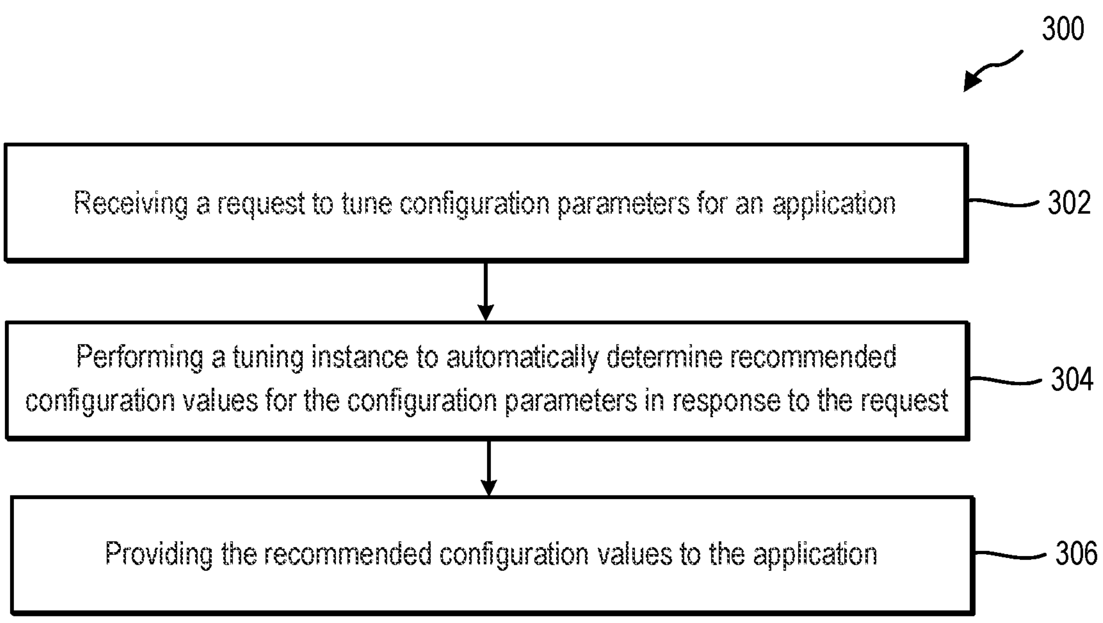
FIG. 3 illustrates an example method for tuning configuration parameters of an application in accordance with implementations of the present disclosure.

Referring now to FIG. 3, illustrated is an example method 300 of tuning configuration parameters of an application. The actions of the method 300 are discussed below with reference to FIGS. 1 and 2.

At 302, the method 300 includes receiving a request to tune configuration parameters for an application. The request is received after the application 104, 106 is deployed into a production environment.

The application 104, 106 invokes a predict API call 16, 30 to the tuning service 102 to fetch recommended configuration values 48, 50 for the configuration parameters 10, 24 for a tuning instance. The tuning service 102 is hosted on the cloud and the applications 104, 106 access the tuning service 102 via customized endpoints. For example, the applications 104, 106 use a customized URL to access the tuning service 102. In some implementations, the recommended configuration values 48, 50 are the same as the values 12, 26 provided for the configuration parameters 10, 24. In some implementations, the recommended configuration values 48, 50 are different from the values 12, 26 provided for the configuration parameters 10, 24.

In some implementations, the configuration parameters include numerical configuration parameters and categorical configuration parameters. Numerical configuration parameters that move over a range of real values (e.g., CPU utilization threshold). Categorical configuration parameters that are discrete values (e.g., number of CPU cores).

At 304, the method 300 includes performing a tuning instance to automatically determine recommended configuration values for the configuration parameters in response to the request. A tuning instance is initiated in response to the application 104, 106 providing a predict API call 16, 30 to the tuning service 102. The tuning instances are automatically created, persisted, and managed by the tuning service 102. A tuning instance module 44 performs a tuning instance to iteratively tune the configuration parameters 10, 24 and identify recommended configuration values 48, 50 for the configuration parameters 10, 22 after the application 104, 106 is deployed into a production environment serving user workloads. In some implementations, the tuning instance performed by the tuning instance module 44 occurs after the application 104, 106 is deployed to adjust the values 12, 26 for the configuration parameters 10, 24 in response to changes in workload, temporal changes, or changes in a system used to deploy the application 104, 106.

In some implementations, the machine learning model 46 uses a tuning algorithm to perform the tuning instance and iteratively tune the configuration parameters 10, 24 until the recommended configuration values 48, 50 improve a reward value 22, 36. The reward value 22, 36 is computed by the application 104, 106 over a predetermined period (1 hour, 24 hours, etc.). The reward function itself changes with time and the same configuration parameter choices and values may have very different effects on the application 104, 106 from one instant to the next. The information stored in the datastore 108 (e.g., the configuration parameters 10, 24 and the values 12, 26) is used as the input for the machine learning model 46 and an output of the machine learning model 46 is the recommended configuration values 48, 50 for the configuration parameters 10, 24.

The machine learning model 46 iteratively tunes the configuration parameters 10, 24 after the application 104, 106 is deployed online using bandit feedback. The machine learning model 46 uses the values 12, 26 of the configuration parameters 10, 24 (e.g., number of CPU cores and memory size for the container) and the feedback from the application 104, 106 (the reward value 22, 36) as input to determine the recommended configuration values 48, 50 for the configuration parameters 10, 24. In some implementations, the machine learning model 46 selects recommended configuration values 48, 50 that maximize the metric of interest 14, 28.

In some implementations, the machine learning model uses Algorithm 1 to perform the tuning instance and iteratively tune the categorical configuration parameters and the numerical configuration parameters until the recommended configuration values 48, 50 improve a reward value 22, 36. The Algorithm 1 maintains different policies for determining the recommended configuration values 48, 50 for the numerical configuration parameters and the categorical configuration parameters. In some implementations, the machine learning model 46 runs the Algorithm 1 until the recommended configuration values 48, 50 for the configuration parameters 10, 24 improve the reward value 22, 36 (e.g., latency or throughput of the application is improved).

In some implementations, the tuning service 102 receives a metric of interest for the application. A selector module 38 selects a subset of configuration parameters 40, 42 to tune in the tuning instance based on the metric of interest 14, 28. The selector modules 38 places the configuration parameters 10, 24 into an order in response to a level of impact of the configuration parameters on the metric of interest.

The selector module 38 selects the subset of configuration parameters 40, 42 from a top of the order. For example, the selector module 38 selects a top 15 configuration parameters 10, 24 to tune. The tuning instance module 44 tunes the subset of configuration parameters 40, 42 in the tuning instance and provides the recommended configuration values 36, 38 for the subset of configuration parameters 40, 42 while ignoring any remaining configuration parameters 10, 24 for the application 104, 106.

In some implementations, the tuning service 102 receives a context 18, 32 for the application 104, 106. In some implementations, the context 18, 32 is a cost associated with changing the configuration parameters 10, 24. In some implementations, the context 18, 32 provides infrastructure information (e.g., machine type) for the machines used for deploying the applications 104, 106. In some implementations, the context 18, 32 provides functionality (e.g., API calls) for the applications 104, 106. In some implementations, the context 18, 32 provides workload information (e.g., requests per second) for the applications 104, 106. In some implementations, the context 18, 32 includes temporal information (e.g., time of day, season information, day of the week). The context 18, 32 may include any additional information that provides a description of the deployment environment or characteristics of the user workloads.

The autoscoper module 52 uses the context 18, 32 to automatically determine a scope for the tuning instance. The tuning instances for the applications 104, 106 may be scoped along at least three dimensions: infrastructure (e.g., machine type), functionality (e.g., API call), and workload (e.g., requests per second). The autoscoper module 52 exploits the context 18, 32 provided by the application 104, 106 to simultaneously perform scoping and configuration tuning. The autoscoper module 52 help applications 104, 106 create, manage, and scope the tuning instances in deployment based on the dynamic context 18, 32 information provided by the applications 104, 106.

At 306, the method 300 includes providing the recommended configuration values to the application. The tuning service 102 provides the recommended configuration values 48, 50 for the configuration parameters 10, 24 to the applications 104, 106 in response to the predict API call 16, 30. In some implementations, the applications 104, 106 automatically modify the values 12, 26 of the configuration parameters 10, 24 with the recommended configuration values 48, 50.

The method 300 automates the post-deployment configuration tuning of the applications 104, 106 and automatically provides recommended configuration values 48, 50 for the configuration parameters 10, 24. The method 300 continues to evaluate the values for the configuration parameters for the applications 104, 106 and as changes occur to the application 104, 106 or the environment of the application 104, 106, the tuning service tunes the configuration parameters 10, 24 to identify new configuration parameter settings (new values for the configuration parameters) for the application 104, 106.

Figure 4:
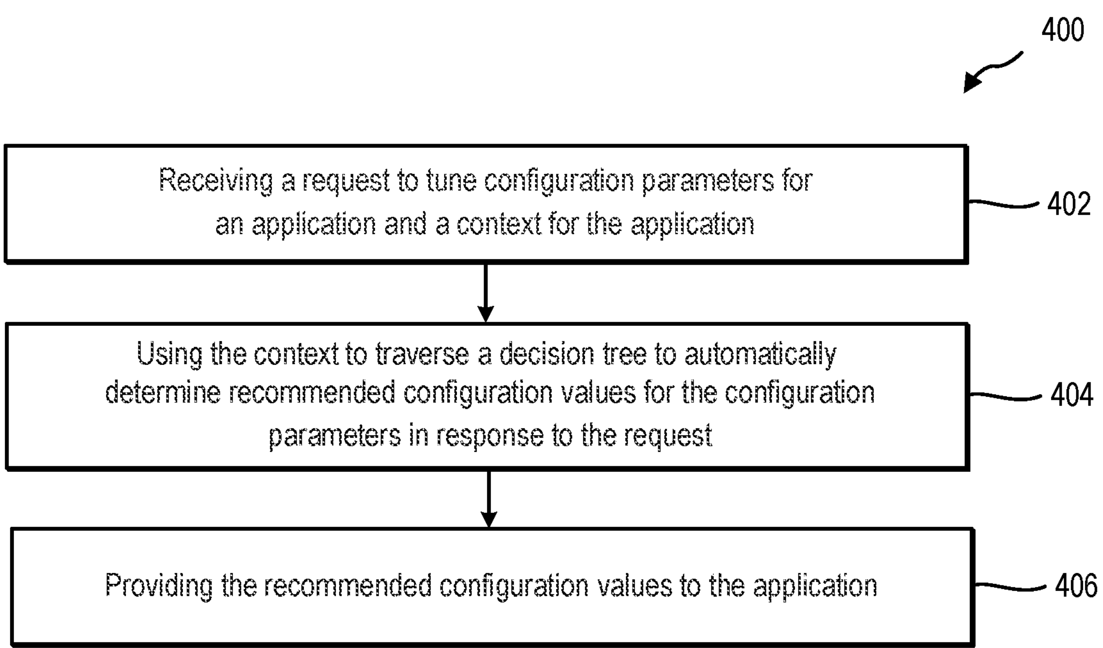
FIG. 4 illustrates an example method for tuning configuration parameters of an application using a context in accordance with implementations of the present disclosure.

Referring now to FIG. 4, illustrated is an example method 400 of tuning configuration parameters of an application using a context. The actions of the method 400 are discussed below with reference to FIGS. 1 and 2.

At 402, the method 400 includes receiving a request to tune configuration parameters for an application and a context for the application. The application 104, 106 invokes a predict API call 16, 30 to the tuning service 102 to fetch recommended configuration values 48, 50 for the configuration parameters 10, 24 for a tuning instance. The tuning service 102 is hosted on the cloud and the applications 104, 106 access the tuning service 102 via customized endpoints. For example, the applications 104, 106 use a customized URL to access the tuning service 102. A tuning instance is initiated in response to the application 104, 106 providing a predict API call 16, 30 to the tuning service 102. The tuning instances are automatically created, persisted, and managed by the tuning service 102.

In some implementations, the predict API call 16, 30 includes a context 18, 32. The context 18, 32 includes a cost associated with changing the configuration parameters, infrastructure information of machines used to deploy the application, workload information for the application, temporal information, or functionality information. The applications 104, 106 may have different performance characteristics on machines with different CPUs or memory sizes, and hence may consider using a different configuration tuning instance for each machine type. Similarly, the applications 104, 106 may behave differently for light versus heavy workloads, and for different API call types.

At 404, the method 400 includes using the context to traverse a decision tree to automatically determine recommended configuration values for the configuration parameters in response to the request. The autoscoper module 52 automatically determines the scope of the tuning instances for the configuration parameters 10, 24 based on the context 18, 32 (e.g., machine type, disk type, spindle speed, workload volume, etc.) provided by the application 104, 106. In some implementations, the autoscoper module 52 uses a machine learning model 56 to use the context 18, 32 to determine scoping rules 54 for the tuning instance.

In some implementations, the autoscoper module 52 uses decision tree models to capture the scoping rules 54. The decision tree models (e.g., the decision tree 200) includes a plurality of nodes and each node of the plurality of nodes includes a scoping rule 54 that is used to determine a path through the decision tree based on the context 18, 32. The decision tree models also include a plurality of leaf nodes and each leaf node includes a configuration parameter 10, 24 and a recommended configuration value 48, 50 for the configuration parameter 10, 24 for a specific context.

Each root-to-leaf node path in the decision tree is a scope based on a specific context, and each leaf maintains a tuning instance for the scope. Each leaf maintains recommended configuration values 48, 50 for a scope and the recommended configuration values 48, 50 are returned for a predict API call 16 satisfying the scope (e.g., the root-to-leaf path in the tree). The recommended configuration values 48, 50 are updated when a reward value 22, 32 arrives from the application 104, 106. The machine learning model 56 uses iterative learning to scope tuning instances via the decision tree. At each round, the machine learning model 56 uses the observed context 18, 32 (e.g., requests per second, cluster information, job information) to traverse the decision tree to determine the recommended configuration values 48, 50 for the configuration parameters 10, 24 based on the context 18, 32 and update the tree model and the leaf instances (e.g., number of core values and memory configuration values) that the machine learning model 56 lands in on the tree model.

In some implementations, the autoscoper module 52 uses the machine learning model 56 to automatically update the scoping rules 54 and the recommend configuration values 48, 50 in leaf nodes of the decision tree in response to receiving a reward value 22, 36 from the application 104, 106. The machine learning model 56 updates the tree model $f_T^{(t)}$ parameters, i.e., the weights in the internal nodes of the tree which make the branching (scoping) decisions, based on the same reward value 22, 36 that was used to update the leaf instance. The machine learning model 56 updates all the internal nodes along the path traversed b $c_t$ based on the same reward value 22, 36 that was used to update the leaf instance. At the end of round t, all the nodes in the scope of $c_t$ will be updated using a single reward value.

At 406, the method 400 includes providing the recommended configuration values to the application. The tuning service 102 provides the recommended configuration values 48, 50 for the configuration parameters 10, 24 to the applications 104, 106 in response to the predict API call 16, 30. In some implementations, the applications 104, 106 automatically modify the values 12, 26 of the configuration parameters 10, 24 with the recommended configuration values 48, 50.

The method 400 performs joint scoping and configuration tuning of configuration parameters 10, 24. The method 400 helps applications 104, 106 create, manage, and scope the tuning instances in deployment based on the dynamic context 18, 32 information provided by the applications 104, 106.

Figure 5:
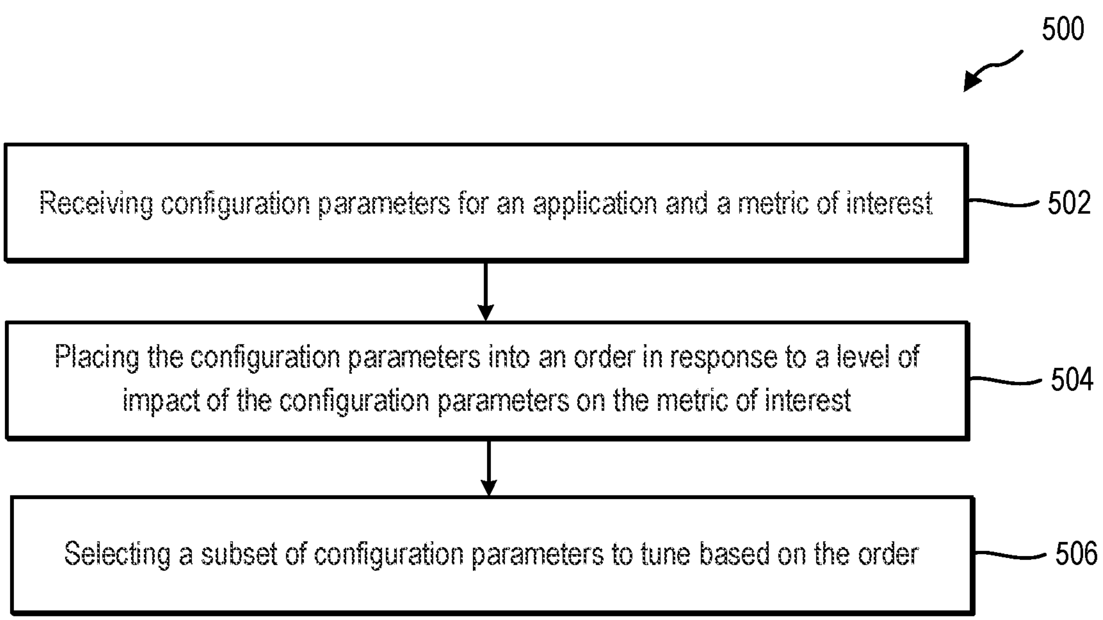
FIG. 5 illustrates an example method for selecting configuration parameters of an application to tune in accordance with implementations of the present disclosure.

Referring now to FIG. 5, illustrated is an example method 500 of selecting configuration parameters of an application to tune. The actions of the method 500 are discussed below with reference to FIGS. 1 and 2.

At 502, the method 500 includes receiving configuration parameters for an application and a metric of interest. The tuning service 102 receives the configuration parameters 10, 24 and the metric of interest(s) 14, 28 from the applications 104, 106. The tuning service 102 is hosted on the cloud and the applications 104, 106 access the tuning service 102 via customized endpoints. For example, the applications 104, 106 use API calls to invoke the customized endpoints (e.g., the URL for the application) to communicate with the tuning service 102. The configuration parameters 10, 24 and the metric of interest 14, 28 are provided to a selector module 38 of the tuning service 102. Example metrics of interest 14, 28 include latency of the application, daily P95 latency of the application, user satisfaction of the application, hourly resource utilization of the application, and/or average job completion time in a workload for the application.

At 504, the method 500 includes placing the configuration parameters into an order in response to a level of impact of the configuration parameters on the metric of interest. In some implementations, the selector module 38 uses a machine learning model to identify a level of impact the configuration parameters 10, 24 on the metric of interests 14, 28. The machine learning model assesses the effect of changing the values 12, 26 each configuration parameter 10, 24 on the application's 104, 106 performance (i.e., the reward value 22, 36), while keeping the other values for the configuration parameters fixed (e.g., to the initial or default value selected). The machine learning model iteratively picks the configuration parameters 40, 42 to maximize the metric of interest 14, 28.

The selector module 38 places the configuration parameters 10, 24 into an order based on the level of impact to the metric of interest 14, 28 (e.g., configuration parameters with a high impact to the metric of interest are placed higher in the list as compared to configuration parameters with a lower impact to the metric of interest).

At 506, the method 500 includes selecting a subset of configuration parameters to tune based on the order. The selector module 38 uses the metric of interests 14, 28 to select the subset of configuration parameters 40, 42. The selector module 38 selects the subset of configuration parameters 40, 42 from a top portion of the ordered list. In some implementations, the configuration selector module 38 picks top-n (where n is a positive integer) configuration parameters 10, 24, sorted by decreasing magnitudes of gradients where n is customizable by the application 104, 106. For example, the selector module 38 selects the top 20 configuration parameters 10, 24 for the subset of configuration parameters 40, 42. Each application 104, 106 may have different configuration parameters 10, 24 and different metrics of interests 14, 28 resulting in different subsets of configuration parameters 40, 42 selected for each application 104, 106.

The selector module 38 minimizes the number of configuration parameters 10, 24 to tune for the applications 104, 106 by identifying a subset of configuration parameters 40, 42 to tune for each application 104, 106. In some implementations, the tuning instance module 44 performs a tuning instance to tune the values 12, 26 for the subset of configuration parameters 40, 42 after the application 104, 106 is deployed into a production environment serving user workloads while ignoring any configuration parameters 10, 24 not included in the subset of configuration parameters 40, 42.

In some implementations, the autoscoper module 52 learns the scoping rules 54 for the subset of configuration parameters 40, 42 to perform joint scoping and configuration tuning at each round for the subset of configuration parameters 40, 42 based on a context 18, 32 provided.

The method 500 prunes the size of the configuration space for the tuning algorithm, which in turn helps reduce the algorithm's sample complexity. In addition, the method 500 helps minimize the number of disruptions (e.g., container restarts) in the application 104, 106 while tuning.

As illustrated in the foregoing discussion, the present disclosure utilizes a variety of terms to describe features and advantages of the methods and systems. Additional detail is now provided regarding the meaning of such terms. For example, as used herein, a "machine learning model" refers to a computer algorithm or model (e.g., a classification model, a clustering model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:

receiving a request to tune configuration parameters for an application;

performing a tuning instance to automatically determine recommended configuration values for the configuration parameters in response to the request, wherein a machine learning model performs the tuning instance using scoping rules obtained from a decision tree that determine a scope of the tuning instance; and providing the recommended configuration values to the application, wherein the machine learning model automatically updates the scoping rules and the recommend configuration values in leaf nodes of the decision tree in response to receiving a reward value from the application.

2. The method of claim 1, wherein a machine learning model uses a tuning algorithm to perform the tuning instance and iteratively tune the configuration parameters until the recommended configuration values improve a reward value.

3. The method of claim 2, wherein an input to the machine learning model is the configuration parameters and a value for the configuration parameters and an output of the machine learning model is the recommended configuration values for the configuration parameters.

4. The method of claim 1, wherein the configuration parameters include numerical configuration parameters and categorical configuration parameters.

5. The method of claim 4, wherein a machine learning model uses a tuning algorithm to perform the tuning instance and iteratively tune the categorical configuration parameters and the numerical configuration parameters until the recommended configuration values improve a reward value.

6. The method of claim 5, wherein the tuning algorithm maintains different policies for determining the recommended configuration values for the numerical configuration parameters and the categorical configuration parameters.

7. The method of claim 1, wherein the request is received after the application is deployed into a production environment.

8. The method of claim 1, further comprising:

receiving a metric of interest for the application; and selecting a subset of configuration parameters to tune in the tuning instance.

9. The method of claim 8, wherein selecting the subset of configuration parameters further includes:

placing the configuration parameters into an order in response to a level of impact of the configuration parameters on the metric of interest; and selecting the subset of configuration parameters from a top of the order.

10. The method of claim 8, wherein the tuning instance tunes the subset of configuration parameters and provides the recommended configuration values for the subset of configuration parameters while ignoring any remaining configuration parameters for the application.

11. The method of claim 1, further comprising:

receiving a context for the application; and using the context to automatically determine a scope for the tuning instance.

12. The method of claim 1, wherein the tuning instance occurs after the application is deployed to adjust values for the configuration parameters in response to changes in workload, temporal changes, or changes in a system used to deploy the application.

13. A method, comprising:

receiving a request to tune configuration parameters for an application and a context for the application;

using the context to traverse a decision tree to automatically determine recommended configuration values for the configuration parameters in response to the request, wherein a machine learning model automatically learns to use the context to traverse the decision tree to determine the recommended configuration values for the configuration parameters for the context; and providing the recommended configuration values to the application, wherein the machine learning model automatically updates scoping rules and the recommend configuration values in leaf nodes of the decision tree in response to receiving a reward value from the application.

14. The method of claim 13, wherein the decision tree includes a plurality of nodes and each node of the plurality of nodes includes a scoping rule that is used to determine a path through the decision tree based on the context.

15. The method of claim 13, wherein the decision tree includes a plurality of leaf nodes and each leaf node of the plurality of leaf nodes include a configuration parameter and a recommended configuration value for the configuration parameter for a specific context.

16. The method of claim 13, wherein each root-to-leaf node path in the decision tree is a scope based on a specific context.

17. The method of claim 13, wherein the machine learning model uses scoping rules in nodes of the decision tree to determine a path to a leaf node for the context.

18. The method of claim 13, wherein the context includes a cost associated with changing the configuration parameters, infrastructure information of machines used to deploy the application, workload information for the application, temporal information, or functionality information.

* * * * *